United States Patent Office 3,825,517
Patented July 23, 1974

3,825,517
THERMOSETTING POLYESTER MOLDING COMPOSITIONS AND METHOD OF PREPARATION
Bartholomew M. Ficarra, Upper Saddle River, N.J., assignor to Reichhold Chemicals, Inc., White Plains, N.Y.
No Drawing. Filed May 25, 1972, Ser. No. 256,848
Int. Cl. C08g 51/04
U.S. Cl. 260—40 R                  23 Claims

ABSTRACT OF THE DISCLOSURE

Polymerizable, thermosetting polyester molding compositions may be prepared by blending together (I) an unsaturated polyester resin and, as the sole crosslinking agent (II) a vinyl ester prepared from an epoxy resin having a melt point up to 100° C. and a vinyl acid, and (III) a polymerization initiator and passing said blend through a plastics extruder at a temperature below the decomposition temperature of the polymerization initiator and pelletizing the product. These solid precatalyzed molding compositions may then be molded into thermoset articles exhibiting high heat distortion and excellent mechanical properties.

---

This invention relates to polymerizable thermosetting polyester molding compositions and to their preparation. These novel compositions comprise a blend of (I) an unsaturated polyester prepared by reacting an unsaturated dicarboxylic acid with a dihydric alcohol and as the sole crosslinking agent (II) a vinyl ester prepared by reacting an epichlorohydrin-4,4'-isopropylidene diphenol epoxy resin, having a melt point of less than about 100° C., with a vinyl acid and (III) a polymerization initiator. The resulting free flowing powder may be passed through a plastics extruder at a temperature below the decomposition temperature of the polymerization initiator and particleized to form a precatalyzed thermosetting molding composition. These particles may then be molded, utilizing a molding apparatus having heated molding surfaces. Molded articles prepared from these compositions exhibit high heat distortion temperature and excellent mechanical properties.

The desirability of having a thermosetting molding composition stems from the fact that for a large number of molding applications high heat distortion temperatures as well as good electrical properties and chemical resistance are necessary. The superior properties of certain unsaturated polyester resins in these areas have made them a prime candidate for this use. It is, therefore, not surprising that unsaturated polyester resins and molding compositions based upon them are widely used in the plastics industry. However, the solid unsaturated polyester must be blended with a liquid crosslinking monomer prior to the heating and molding operation. For the most part, then, these are liquid or at best semi-liquid systems although numerous attempts at preparing satisfactory dry systems have been proposed. The inclusion of the liquid polymerizable monomer, for instance styrene, presents storage and stability problems such as premature gelation and the like. To overcome this, inhibitors such as benzoquinone and hydroquinone are added to prolong their storage life. This in itself presents another problem since each batch of resin will not, after standing for a period of time, in storage, contain the same amount of inhibitor. This will allow faster gelation during the molding cycle for some resins than others. Therefore, the molding manufacturer must change his molding conditions each time he changes from one batch of resin to another.

As generally practiced in the art, polyester resin molding compositions have been made up of a resin, a monomer, a catalyst and a filler. These have tended to be a liquid because of the solvent action of the monomer on the resin. Upon addition of the filter, those components have turned into a sticky semi-liquid mass known to the trade as "gunk." This "gunk" is very difficult to handle and requires expensive equipment for processing.

One of the methods employed to overcome this problem has been to try to chill the "gunk" so as to make it a solid and then break it up. This is cumbersome, impratical and often requires specialized equipment for handling, adding to the cost of processing.

U.S. Pat. No. 3,455,870 discloses a method for overcoming this problem. According to the disclosure of this patent, a free flowing molding powder is prepared from a polyester resin which is first ground and then blended with a filler having absorbed upon it a monomer and polymerization catalyst.

To date no one has prepared a precatalyzed thermosetting, unsaturated polyester molding composition which is free flowing, has prolonged storage life and stability and yet may be processed on standard equipment.

It is, therefore, an object of this invention to prepare thermosetting unsaturated polyester molding compositions which have none of the heretofore described disadvantages.

Another object of this invention is to prepare thermosetting unsaturated polyester molding compositions which are free flowing, are storage stable over extended periods of time, and which may be processed on standard molding equipment.

Yet another object of this invention is to prepare thermosetting unsaturated polyester molding compositions which are precatalyzed during manufacture and are stable over extended periods of time.

Further objects and the entire scope of applicability of the present invention will become apparent from the detailed specification given hereinafter; it should be understood, however, that the detailed specification and specific examples while indicating preferred embodiments of the invention are given by way of illustration only, since various changes and modifications within the spirit and scope of this invention will become apparent to those skilled in the art.

It has now been found that these and other objects may be achieved by preparing a thermosetting unsaturated polyester molding composition comprising: (I) an unsaturated polyester resin prepared by reacting (A) at least one member selected from the group consisting of unsaturated dicarboxylic acids and their acid anhydrides with (B) a polyhydric alcohol and, as the sole crosslinking agent (II) a vinyl ester prepared by reacting (C) an epoxy resin having a melt point ranging up to about 100° C. with (D) a vinyl acid and (III) a polymerization initiator. This basic polyester molding composition may be used as is or it may be further compounded with fillers, pigments, flame retardant compounds, mold release agents and the like to produce filled molding compounds. An unexpected feature of this invention is the fact that instant molding compositions, either filled or unfilled, may be passed through a common plastic's extruder at an elevated temperature but below the decomposition temperature of the polymerization initiator and the resulting product fragmented or pelletized. There is then produced a pre-catalyzed, thermosetting, molding composition wherein each particle contains filler, pigment, catalyst, polyester resin, crosslinking agent and the like in a form readily processable on molding equipment made to handle pellets or granules. These pellets may be stored under any conditions, i.e., heat, dampness, cold and yet are always free flowing and non-caking. This aspect of our invention, therefore, provides a means for producing a complete molding composition in pellet form, whereby the end user or molder does nothing but process the pellets on his molding equipment. He does not have to add separately any ingredients. This frees the individual molder from buying, storing and handling large amounts of various pigments, fillers, mold release agents and the like. Most important of all, the catalyst is already incorporated into the molding compound thereby eliminating the danger of storing and handling quantities of concentrated polymerization initiators. Further, there is provided a means of insuring product uniformity. That is, a molder may use part of the molding compound at one time, place it back in storage and it will retain its same curing and processing characteristics when he next uses the compound. He is not faced with variation, as when each batch is catalyzed just prior to use.

The versatility of the instant molding composition is as wide as the art of molding thermoset compounds itself. They may be injection molded, compression molded, or transfer molded or the resin composition may be extruded over glass filaments and then chopped into any desired length.

The disclosure of instant invention of solid thermosetting unsaturated polyester molding powders based upon polyacrylates of polyepoxides as the sole crosslinking monomer is indeed unique and novel and represents an advancement of the art of molding compounds.

The use of the polyacrylate of a polyepoxide as the only crosslinking agent utilized in these molding compositions is indeed novel and surprising. The preparation of these crosslinking agents is known and their preparation is described for instance in U.S. Pat. 3,066,112 and 3,179,623. It has even been suggested that they will react with unsaturated polyesters as for instance see U.S. Pats. 3,256,226; 3,301,743 and 3,317,465. However, this concept has never been explored. In U.S. Pat. 3,621,093 polyacrylates of polyepoxides have been used in conjunction with other unsaturated crosslinking monomers in minor proportions; functioning to accelerate the curing of the unsaturated polyester resin with the unsaturated crosslinking monomer. Here again a "gunk" type molding composition is described.

Equally unique and surprising is the heretofore mentioned feature of the production of precatalyzed pellets or granules from instant molding compositions. Nowhere in the art are precatalyzed, storage stable unsaturated polyester molding compositions including the crosslinking monomer disclosed.

Practiced in its most general way instant molding compositions are prepared by physically blending together (I) an unsaturated polyester prepared from at least one unsaturated dicarboxylic acid such as isophthalic and a polyhydric alcohol such as propylene glycol and, as the sole crosslinking agent (II) a vinyl ester prepared from a 4,4'-isopropylidene diphenol-epichlorohydrin epoxy resin which is a liquid at room temperature and having an epoxide equivalent weight of about 180 to about 195 and acrylic acid and (III) a polymerization initiator such as dicumyl peroxide. The separate components are added together into a suitable mixing apparatus and blended. The result is a fluffy, free flowing non-caking powder. This powder may be molded or it may be passed through a screw type plastics extruder at a temperature of about 100° C. and pelletized. In turn these pellets may be used for molding.

The term "unsaturated polyester resin" as used generally herein is intended to include within its meaning condensation products that are obtained from alpha, beta-ethylenically unsaturated dicarboxylic acids and/or their anhydrides by esterification carried out with a molar excess of 2–30% polyhydric alcohols. As alpha, beta-ethylenically unsaturated dicarboxylic acids may be used, for example, maleic acid, maleic acid anhydride, fumaric, itaconic, citraconic, mesaconic and aconitic acids and the like, and mixtures thereof.

A part up to the entirety of the alpha, beta-ethylenically unsaturated dicarboxylic acids may be replaced, in a known manner, with saturated dicarboxylic acids such as o- and isophthalic acid, tetra- and hexahydrophthalic acid, tetrachlorophthalic acid, hexachloroendo-methylene-tetra-hydrophthalic acid, endomethylene - tetra-hydrophthalic acid, adipic and sebacic acid, as well as dimerized linseed oil and soybean oil fatty acids, or their anhydrides and the like, and mixtures thereof.

As polyhydric alcohols may be used, for example, dihydric alcohols, such as ethylene glycol, propanediol-1,2, butanediol-1,4, diethylene glycol, dipropylene glycol and their higher homologues, neopentyl glycol, 2,2,4-trimethylpentanediol-1,3, pentyl glycol, oxyalkylated bisphenols, hydrogenated bisphenols, dimethylolcyclohexane and mixtures thereof. However, it is also possible to use, together with these, tri- and polyhydric alcohols such as glycerin, trimethylol-ethane, trimethylolpropane as well as pentaerythrite and mixtures thereof. Further modifications of the properties of the polyester resins can be obtained by the addition of mono-functional compounds during the esterification, for example, by the addition of fatty acids having 8 to 22 carbon atoms, benzoic acid, resinic acids, partially hydrogenated resinic acids, such as abietic acid and/or dihydro- or tetrahydro-abietic acid, monohydric n- and isoalcohols having 4 to 12 carbon atoms, benzyl alcohol, resin alcohols, as for example, abietyl alcohol and the like, and mixtures thereof.

The esterification is carried out, in a known manner, until a low acid number of 10 to 40, preferably less than 30, is arrived at.

It is possible to add inhibitors during the preparation of the unsaturated polyester. As inhibitors it is possible to use, for example, benzoquinone and p-tert-butylpyrocatechol and the like and mixtures thereof but this is not necessary.

The polyacrylates of polyepoxides i.e. the vinyl esters which are utilized as the unsaturated crosslinking compound for this invention are well known in the art. They are prepared by reacting together an unsaturated vinyl acid and a polyepoxide. Vinyl acids which may be used include acrylic, crotonic, isocrotonic, methacrylic, sorbic and cinnamic acids. Polyepoxides suitable for the practice of this invention include 4,4'-isopropylidene-diphenol epichlorohydrin epoxy resins, brominated 4,4'-isopropylidene diphenol-epichlorohydrin epoxy resins and phenol-epichlorohydrin epoxy resins having a melt point ranging up to about 100° C. Vinyl esters prepared from acrylic acid or methacrylic acid and 4,4'-isopropylidene diphenol-epichlorohydrin epoxy resins are preferred because of outstanding results obtained therewith.

The ratio of polyester to vinyl ester covers a broad range from about 90 parts polyester to about 10 parts vinyl ester to about 99 parts vinyl ester to about 1 part polyester by weight. However, it has been found that rapid cures combined with an excellent product, both filled and unfilled, may be produced when the ratio of polyester to vinyl ester ranges from about 30:70 parts to about 70:30 parts and preferably about 60:40 parts by weight.

As a polymerization initiator it is preferred to use an organic peroxide selected from cumene hydroperoxide, p-menthane hydroperoxide, 2,5 - dimethylhexane-2,5-dihydroperoxide, tert-butyl peroxybenzoate, di-tert-butyl perphthalate, dicumylperoxide, 2,5 - dimethyl-2,5-bis-(tert-butylperoxy) hexane, 2,5 - dimethyl-2,5-bis (tert-butyl peroxy) hexyne-3, bis (tert-butylperoxyisopropyl) benzene and di-tert-butyl peroxide and the like. The peroxide is chosen such that it will not decompose during the compounding step in the plastic extruder but yet will rapidly decompose at the desired molding temperature. It can be seen that a large degree of flexibility is possible thus broadening the scope of this invention and allowing molding compositions to be formulated to fit the application. Under average conditions the preferred peroxide is dicumylperoxide.

The amount of polymerization initiator used may range from about 0.01% to about 10% by weight based upon the total weight of the polyester and vinyl ester used. However, for practical purposes from about 1% to about 5% is preferred.

The polymerizable mixture according to the present invention, may contain as additional conventional components fillers, such as talcum, clays, carbonates, asbestos powder and fiber, quartz powder, chalk, dolomite, kieselguhr, heavy spar, and reinforcing fillers such as glass fibers in their various forms, and mixtures thereof.

For coloring the mixture according to the present invention, it is possible to use dyes and/or inorganic pigments. For this purpose, fundamentally all the compounds commonly used in the lacquer and plastics industry are suitable so far as they have no detrimental effect on the storage stability of the present mixtures, i.e., initiate a premature inter-polymerization between the unsaturated polyester resin and the copolymerizable vinyl ester compound.

Illustrative digest pigments suitable for this purpose are set forth for example in *Organic Protective Coatings*, Reinhold Publishing Corp., 1953, pages 155–166.

It should be noted that the excellent flame retardant properties of those compositions containing a halogenated polyester or halogenated vinyl ester may be further enhanced through the addition of known flame retardant compounds such as chlorinated waxes, chlorinated polyethylene, polyvinyl chloride, antimony trioxide, bismuth trioxide and the like.

Mold release agents and other compounding aids may be formulated into the mix as desired.

The amount of filler, pigments and the like which may be added ranges up to about 600% by weight based upon the total weight of the polyester and vinyl ester employed. About 200–300% by weight is preferred in most instances.

The invention will be more readily understood by reference to the accompanying specific examples which are intended as illustrative rather than as limiting invention except as defined in the accompanying claims.

PREPARATION OF UNSATURATED POLYESTERS

Example 1

To a resin flask equipped with stirrer, heating mantle, water trap, thermometer and inert gas sparge was added 1830 grams isophthalic acid and 1820 grams propylene glycol with mixing under a dry nitrogen blanket. The temperature was raised to about 225° C. over a period of about 4½ hours and held until an acid number of 20 was obtained. Then the temperature was lowered to about 180° C. and .2 grams hydroquinone and 1080 grams maleic anhydride was added. Temperature was then increased to 225° C. for an additional 3 hours and 0.4 grams hydroquinone was added and the resin was removed and allowed to cool. The final acid number was 17.5.

EXAMPLE 2–9

Using essentially the same procedure as outlined in Example 1, the following polyesters were prepared:

| | Examples | | | | | | | |
|---|---|---|---|---|---|---|---|---|
| | 2 | 3 | 4 | 5 | 6 | 7 | 8 | 9 |
| Tetrabromophthalic anhydride | | | | | 1372 | | | |
| Tetrachlorophthalic anhydride | | | | | | | 2,010 | |
| Isophthalic acid | | | | | | | | |
| Phthalic anhydride | 445 | | | | | 740 | | |
| Maleic anhydride | 636 | 636 | 636 | 636 | 706 | 2,160 | 980 | 470 |
| Fumaric acid | 2,260 | 2,260 | 2,260 | 2,260 | | | | |
| Ethylene glycol | 1,710 | 1,520 | 1,520 | 1,520 | | 477 | | 690 |
| Propylene glycol | 208 | 208 | 208 | | 1,256 | 1,300 | 1,197 | |
| Neopental glycol | | | | | 873 | | | |
| Dicyclopentadiene | | | 855 | 855 | | | | |
| Diethylene glycol | | | | | | | | 190 |
| Acid number | 27 | 28 | 25 | 29 | 30 | 28 | 29 | 27 |

PREPARATION OF VINYL ESTERS

Example 10

Into a round bottomed flask equipped with a stirrer, heating mantle, gas inlet and outlet, dropping funnel and thermometer was charged 253 grams of an 4,4'-isopropylidene diphenol-epichlorohydrin epoxy resin, which was a liquid at room temperature and had a molecular weight of about 360–390, 94 grams glacial acrylic acid and 0.25 grams toluhydroquinone. The temperature was raised to 75° C. with stirring and 5 grams benzyl trimethylammonium chloride (as a 60% solution in water) was added over a one-hour period. After the exotherm subsided the temperature was held at 78–82° C. until the acid number was ten. The product was then allowed to cool to about 40–50° C. and removed from the flask.

Example 11

The reaction according to Example 10 was repeated except that 112 grams of methacrylic acid was substituted for the acrylic acid.

Example 12

Into a reaction aparatus equipped as in the previous example was charged 520 grams of a brominated 4,4' isopropylidene diphenol-epichlorohydrin epoxy resin which was a viscous liquid at room temperature and having a molecular weight of about 480–520, 144 grams of glacial acrylic acid and 0.4 grams of toluhydroquinone. The temperature was raised to 80° C. with stirring and then 8 grams of benzyl trimethylammonium chloride (as a 60% solution in water) was added over a period of 45 minutes.

After the addition of the benzyl trimethylammonium chloride was complete the temperature was allowed to rise to about 90° C. These conditions were maintained, until the acid number was 8.9 at which time the resin was cooled to about 40° C. and removed from the flask.

Example 13

The reaction according to Example 12 was repeated except that 172 grams of methacrylic acid was substituted for the acrylic acid.

Example 14

Into a reaction apparatus equipped as in the previous example was charged 330 grams of an epoxy novolac resin solution. (85% solids solution of an epoxy novolac resin having a melt point of about 98° F., and a molecular weight of about 350–370 in methyl ethyl ketone), 105 grams acrylic acid of 0.4 grams toluhydroquinone. The temperature was increased with stirring to 70° C. and 7.5 grams of benzyl trimethylammonium chloride (as a 60% solution in water) was added over a period of about 50 minutes at which time the temperature was increased to 70° C. and held until the acid number was 15. At this point the reflux condenser was exchanged for a Claisen take-off head and condenser and the methyl ethyl ketone was distilled off. The resin was allowed to cool to about 40° C. and collected.

Example 15

The reaction according to Example 14 was repeated except that 125 grams methacrylic acid was substituted for the acrylic acid.

Example 16

Into a reaction apparatus as previously described was charged 310 grams of a 4,4′ isopropylidene diphenolepichlorohydrin epoxy resin which was a liquid at room temperature and had a molecular weight of about 360–390, 49 grams of 4,4′ isopropylidene diphenol, 254 grams methacrylic acid and 0.75 grams toluhydroquinone. The temperature was raised with stirring to 80° C. and 16 grams benzyl trimethylammonium chloride (as a 60% solution in water) was added over a period of 70 minutes at which time the temperature was increased to 85° C. and maintained until the acid number was 18. The resin was cooled to about 50° C. and collected.

Example 17

The reaction according to Example 16 was repeated except that 210 grams of acrylic acid was substituted for the methacrylic acid.

Example 18

Into a reaction apparatus as previously described was charged 304 grams of a 4,4′-isopropylidene diphenol-epichlorohydrin epoxy resin, which was a liquid at room temperature and having a molecular weight of about 360–390, 88 grams acrylic acid, 18 grams fumaric acid and .1 grams toluhydroquinone. The temperature was raised to 80° C. and 3 grams benzyl trimethylammonium chloride (as 60% solution in water) was added over a one-hour period. After the exotherm subsided the temperature was maintained at 80°–82° C. until the acid number was ten; the product was allowed to cool to about 40°–45° C. and removed from the flask.

PREPARATION OF MOLDING COMPOSITIONS

Example 19

Twenty grams of a polyester resin prepared according to Example 1, 10 grams of a vinyl ester prepared according to Example 10, 51 grams clay, 7 grams asbestos, 1 gram zinc stearate and 0.6 grams dicumyl peroxide were mixed together in a Baker-Perkins* mixer at a temperature of 80° C. After mixing for 10 minutes the mixture was removed and rolled into sheets on a two-roll mill for cooling. After cooling the sheets were ground in a hammer mill. This material was designated molding composition #1.

Example 20

The molding composition according to Example 19 was repeated except that the vinyl ester used was prepared according to Example 11. This material was designated molding composition #2.

Example 21

Ten grams of a polyester resin prepared according to Example 1, 10 grams of a polyester resin prepared according to Example 7, 10 grams of the vinyl ester prepared according to Example 10 were mixed with the same fillers and blended as in Example 19. This material was designated molding composition #3.

Example 22

The foregoing Example was repeated except that 10 grams of a vinyl ester prepared according to Example 11 was substituted. This material was designated molding composition #4.

Example 23

Twenty grams of a polyester prepared according to Example 1, 10 grams of a vinyl ester prepared according to Example 12, 51 grams of clay, 7 grams asbestos, 1 gram zinc stearate, 0.6 grams dicumyl peroxide and 10 grams ¼ inch glass fibers were mixed in a Baker-Perkins mixer at a temperature of about 90° C. for about 15 minutes. This mixture was then removed and sheeted out on a two-roll mill for cooling. After cooling the sheets were ground in a hammer mill. This material was designated molding composition #5.

Example 24

The molding composition according to Example 23 was again prepared only using as the vinyl ester the compound prepared according to Example 13. This material was designated molding composition #6.

Example 25

The molding composition according to Example 23 was again prepared only this time the polyester used was 10 grams of a polyester prepared according to Example 2 and the vinyl ester was 10 grams of a vinyl ester prepared according to Example 14. This material was designated molding composition #7.

Example 26

The previous Example 23 was repeated exactly except that the vinyl ester used was 10 grams of a vinyl ester prepared according to Example 15. This material was designated molding composition #8.

Example 27

Twenty grams of a polyester prepared according to Example 1, 10 grams of a vinyl ester prepared according to Example 6, 49 grams clay, 8 grams asbestos, 1 gram zinc stearate, 0.6 grams dicumyl peroxide and 10 grams ¼ inch glass fibers were mixed in a Baker-Perkins blender at a temperature of about 80° C. for about 10 minutes. The mixture was removed and rolled into sheets on a two-roll mill for cooling and then the cooled sheets were ground in a hammer mill. This material was designated molding composition #9.

Example 28

The previous example was repeated exactly except that the vinyl ester used was 10 grams of a vinyl ester prepared according to Example 17. This material was designated molding composition #10.

Example 29

Ten grams of a polyester prepared according to Example 1, 10 grams of a polyester prepared according to Example 8, 10 grams of a vinyl ester prepared according to Example 10, 50 grams calcium carbonate, 8 grams asbestos, 11 grams wood flour, 1 gram zinc stearate and 0.6 grams dicumyl peroxide were mixed in a Baker-Perkins mixer and ground as heretofore described. This material was designated molding composition #11.

---
*Baker Perkins, Inc., Food & Chemical Machinery Division, Saginaw, Mich. 48601.

Example 30

The previous example was repeated exactly except that 12 grams ¼ inch sisal fibers was added before blending. This material was designated molding composition #12.

Example 31

Twenty grams of a polyester prepared according to Example 6, 10 grams of a vinyl ester prepared according to Example 10, 51 grams clay, 7 grams asbestos, 1 gram zinc stearate, 0.6 gram dicumyl peroxide and 10 grams ¼ inch glass fibers were mixed in a Baker-Perkins and ground as previously described. This material was designated as molding composition #13.

Example 32

Twenty grams of a polyester prepared according to Example 9, 10 grams of a vinyl ester prepared according to Example 10, 51 grams clay, 7 grams asbestos, 1 gram zinc stearate, 0.7 gram dicumyl peroxide and 10 grams ¼ inch glass fibers were mixed in a Baker-Perkins and ground as previously described. This material was designated molding composition #14.

Example 33

Ten grams of a polyester prepared according to Example 1, 10 grams of a polyester prepared according to Example 5, 10 grams of a vinyl ester prepared according to Example 10, 41 grams clay, 7 grams asbestos, 10 grams wood flour, 1.5 grams zinc stearate and 0.6 gram dicumyl peroxide were mixed in a Baker-Perkins mixer and ground as previously described. This material was designated molding composition #15.

Example 34

Ten grams of a polyester prepared according to Example 4, 10 grams of a polyester prepared according to Example 1, 10 grams of a vinyl ester prepared according to Example 10, 10 grams activated alumina, 7 grams asbestos, 41 grams clay, 1.5 grams zinc stearate and 0.6 gram dicumyl peroxide were mixed in a Baker-Perkins mixer and ground as previously described. This material was designated molding composition #16.

Example 35

The previous example was repeated except that 10 grams of a polyester prepared according to Example 3 was substituted for the polyester from Example 1 and additionally 10 grams of ¼ inch glass fibers were also added to the mixer. This material was designated molding composition #17.

Example 36

The molding compound prepared according to Example 34 was repeated three times exactly except using 3 different peroxides. In molding compound 18A the peroxide was 0.6 gram di-tert-butyl peroxide, in 18B the peroxide was 0.6 gram 2,5-dimethyl-2,5 bis (tert-butyl peroxy) hexane and in 18C the peroxide was 0.6 gram 2,5-dimethyl-2,5 bis (tert-butyl peroxy hexyne-3). This material was designated molding composition #18A, #18B and #18C and was tested in Example 56.

Example 37

Twenty-five grams of a polyester prepared according to Example 1, 5 grams of a vinyl ester prepared according to Example 10, 41 grams clay, 7.5 grams asbestos, 10 grams alumina, 1 gram zinc stearate, 10 grams ¼ inch glass fibers and 0.6 gram dicumyl peroxide were blended in a Baker-Perkins and ground as previously described. This material was designated molding composition #19.

Example 38

The material of Example 37 was again prepared except that the polymer used for 5 grams of a polyester prepared according to Example 1 and the vinyl ester used was 25 grams of a vinyl ester prepared according to Example 10. This material was mixed in a Baker-Perkins at a temperature of about 100° C. for a period of about 10 minutes and sheeted out in a two-roll mill and allowed to cool. The sheets were soft and plyable and could not be ground. This material could not be injection molded at room temperature and therefore this ratio of vinyl ester to polyester represents the lower practical limit. However this material could be transfer molded. This material was designated molding composition #20.

Example 39

Twenty grams of a polyester prepared according to Example 1 and 10 grams of a vinyl ester prepared according to Example 10 and 0.6 gram dicumyl peroxide were mixed in a Baker-Perkins blender as previously described and ground. This granular material was slightly soft and tacky but could be injection molded. This material was designated molding #21.

Example 40

Twenty grams of a polyester prepared according to Example 6, 10 grams of a vinyl ester prepared according to Example 10, 51 grams clay, 7 grams asbestos, 1 gram zinc stearate, 2.5 grams antimony trioxide, 10 grams ¼ inch glass fibers and 0.6 gram dicumyl peroxide were mixed in a Baker-Perkins blender and ground as previously described. This material was designated molding composition #22.

Example 41

Twenty grams of a polyester prepared according to Example 1, 10 grams of a vinyl ester prepared according to Example 18, 40 grams clay, 17 grams asbestos, 10 grams ¼ inch glass fibers, 1.5 grams zinc stearate and 0.6 gram dicumyl peroxide were mixed in a Baker-Perkins mixer and ground as previously described. This material was designated molding composition #23.

Example 42

Example 1 was repeated exactly except that 1 gram of DuPont Permanent Red 2B available from E. I. Du Pont de Nemours & Co., Inc., Pigments Dept., Wilmington, Del., was added. This composition was designated molding composition #24.

MOLDING AND EXTRUDING EXAMPLES

Example 43

Molding composition #1 was injection molded and tested as follows:

| Test | ASTM method | Results |
|---|---|---|
| Hardness, Rockwell, M scale | D-785 | 96. |
| Hardness, Barcol | D-2583 | 67. |
| Hardness, Shore (A), (D) of green sheet | D-2240 | |
| Deflection temperature at 264 p.s.i. | D-648 | 129° C. |
| Tensile strength | | 3,900 p.s.i. |
| Elongation | | 0.15%. |
| Tensile modulus | D-638 | $2.08 \times 10^6$ p.s.i. |
| Flexural strength | | 12,200 p.s.i. |
| Flexural modulus | D-790 | $1.94 \times 10^6$ p.s.i. |
| Compressive strength | | |
| Compressive modulus | | |
| Compressive deflection at yield | D-695 | |
| ⅛ inch water absorption at 25° C.—24 hours | | 0.17%. |
| ⅛ inch water absorption at 100° C.—2 hours | D-570 | 0.54%. |
| Impact (IZOD) | D-256 | 0.32 ft.-lbs/inch. |
| Dielectric strength S/T | D-149 | 449 volts/mil. |
| Step by step | | |
| Dielectric constant, 60 cycles | | 5.46. |
| Dielectric constant, $10^6$ cycles | | 4.67. |
| Dissipation factor, 60 Hz. | | <1%. |
| Dissipation factor, $10^6$ Hz. | | 0.0170. |
| Loss index, 60 Hz. | | |
| Loss index, $10^6$ Hz. | D-150 | 0.0794. |
| Arc resistance | D-495 | 190 sec. |
| Mold shrinkage inch/inch | D-955 | .00485. |
| Specific gravity | D-792 | 1.90. |
| HLT-15 | | 0/100. |

The following table "Table I" illustrates molding and extruding Examples No. 46–62 and the physical properties gathered thereon.

TABLE I

| Example | Composition number | Molded | Heat distortion temperature, °C. | Notched Izod (ft., lbs., in.) | Barcol hardness | HLT-15 |
|---|---|---|---|---|---|---|
| 46 | 2 | Injection, 350° F./2 min. | 200 / 106 | 1.64 / .27 | 68 / 64 | |
| 47 | 5 | Compression | >200 | .96 | | |
| 48 | 7 | Transfer, 350° F./3 min. | >200 | 1.54 | | |
| 49 | 9 | Compression | 125 | 1.31 | 62 | |
| 50A | 11 | Transfer, 350° F./3 min. | 187 | .31 | | |
| 50B | 11 | ...do... | 184 | .32 | 60 | 20100 |
| 51 | 13 | Compression | 108 | 2.17 | 60 | 20100 |
| 52 | 14 | Compression | 110 | 2.27 | 60 | 40/100 |
| 53 | 15 | Transfer, 350° F./3 min. | 160 | .33 | | |
| 54 | 16 | Transfer | 195 | .28 | | |
| 55 | 17 | Compression | 200 | 2.46 | | |
| 56 | 18A | ...do... | 134 | .24 | 6/66 | |
| 56 | 18B | ...do... | 150 | .28 | 6/68 | |
| 56 | 18C | ...do... | 136 | .28 | 6/66 | |
| 57 | 19 | ...do... | 100 | 1.2 | 62 | |
| 58 | 20 | ...do... | >205 | 2.8 | 64 | |
| 59 | 21 | Compression, 350° F. | | .25 | 50 | |
| 60 | 22 | Compression | >200 | 1.37 | | 100/100 |
| 61 | 23 | Compression, 350° F./5 min. | >205 | 1.9 | 60 | |
| 62 | 24 | Compression | 129 | .32 | 67 | 0/100 |

Example 44

Molding composition #1 was transfer molded and tested as follows:

| Test | ASTM method | I |
|---|---|---|
| Hardness, Rockwell | D-785 | 96. |
| Hardness, Barcol | D-2583 | 67. |
| Hardness, Shore (D) of green sheet | D-2240 | |
| Deflection temperature at 264 p.s.i. | D-648 | 129° C. |
| Tensile strength | | 3,900. |
| Elongation | | 0.15%. |
| Tensile modulus | D-638 | $2.08 \times 10^6$. |
| Flexural strength | | 12,200. |
| Flexural modulus | D-790 | $1.94 \times 10^6$. |
| Compressive strength | | |
| Compressive modulus | | |
| Compressive deflection at yield | D-695 | |
| ⅛ inch water absorption at 25° C.—24 hours | | 0.17%. |
| ⅛ inch water absorption at 100° C.—2 hours | D-570 | 0.54%. |
| Impact (IZOD) | D-256 | |
| From 4-inch disc | | 0.32. |
| Dielectric strength S/T | D-149 | 449 volts/mil. |
| Step by step | | 348. |
| Dielectric constant, 60 cycles | | 5.46. |
| Dielectric constant, $10^6$ cycles | | 4.67. |
| Dissipation factor, 60 Hz | | <1%. |
| Dissipation factor, $10^6$ Hz | | 0.0170. |
| Loss index, 60 Hz | D-150 | |
| Loss index, $10^6$ Hz | | .0794. |
| Arc resistance | D-495 | 190.7. |
| Mold shrinkage inch/inch | D-955 | |
| Specific gravity | D-792 | 1.90. |

Example 45

Molding composition #3 was transfer molded and tested as follows:

| Test | ASTM method | Results |
|---|---|---|
| Hardness, Rockwell | D-785 | 100-L. |
| Hardness, Barcol | | 69/71. |
| Hardness, Shore (A), (D) of green sheet | D-2240 | A-87 D-55/45. |
| Deflection temperature at 264 p.s.i. | D-648 | >200° C. |
| Tensile strength | | 8,296 p.s.i. |
| Elongation | | .39%. |
| Tensile modulus | D-638 | $1.95 \times 10^6$ p.s.i. |
| Flexural strength | | 12,273 p.s.i. |
| Flexural modulus | D-790 | $1.87 \times 10^6$. |
| Compressive strength | | 23,574 p.s.i. |
| Compressive modulus | | $1.7 \times 10^3$ p.s.i. |
| Compressive deflection at yield | D-695 | |
| ⅛ inch water absorption at 25° C.—24 hours | | .19%. |
| ⅛ inch water absorption at 100° C.—2 hours | | .85%. |
| Impact (IZOD) | D-256 | .31 feet-lbs./inches. |
| Dielectric strength S/T | D-149 | 428 volts/mil. |
| Dielectric strength, step by step | | 285 volts/mil. |
| Dielectric constant, 60 cycles | | 11.09. |
| Dielectric constant, $10^6$ cycles | | 5.21. |
| Dissipation factor, 60 Hz | | <1%. |
| Dissipation factor, $10^6$ Hz | | .052. |
| Loss index, 60 Hz | | 0. |
| Loss index, $10^6$ Hz | D-150 | .2713. |
| Arc resistance | D-495 | 189.1 seconds. |

Example 63

The table in this example demonstrates the fire retardant properties of those molding compositions of this invention prepared from halogenated ingredients with and without added flame retardant agents.

| Molding composition Number: | ASTM-D635 | HLT-15 |
|---|---|---|
| 1 | | 0/100 |
| 5 | NB | 20/100 |
| 13 | NB | 20/100 |
| 14 | NB | 40/100 |
| 22 | NB | 100/100 |

As can easily be seen, these new polyester molding compositions may be made quite flame retardant through the addition of the usual flame retardant compounds. Furthermore, those molding compositions prepared from compounds containing halogen exhibit excellent flame retardant properties without the addition of further flame reduction agents.

What is claimed is:

1. A polymerizable thermosetting polyester composition comprising from about 1% to about 90% by weight, based upon the total weight of (I) and (II) used of, (I) at least one unsaturated polyester resin prepared by reacting (A) at least one member selected from the group consisting of unsaturated dicarboxylic acids and their acid anhydrides with (B) a polyhydric alcohol and (II) as the sole crosslinking agent for the unsaturated polyester resin from about 10% to about 99% by weight, based upon the total weight of (I) and (II) used of (II) a vinyl ester prepared by reacting one mole of (C) an epoxy resin selected from a group consisting of 4,4' isopropylidene diphenol-epichloro hydrin epoxy resins, brominated 4,4'-isopropylidene diphenol-epichlorohydrin epoxy resins and phenol-epichlorohydrin epoxy resins having a melt point ranging up to about 100° C. with at least 2 moles of (D) a vinyl acid and from about 1% to about 10% by weight, based upon the total weight of (I) and (II) used of (II) a polymerization initiator.

2. The polymerizable thermosetting polyester composition according to Claim 1 wherein (A) is at least one member selected from a group consisting of isophthalic acid, phthalic acid, phthalic anhydride, tetrabromophthalic anhydride, tetrachlorophthalic anhydride, maleic acid, maleic anhydride and fumaric acid and (B) is at least one member selected from a group consisting of ethylene glycol, propylene glycol, diethylene glycol and neopental glycol.

3. The polymerizable thermosetting polyester composition according to Claim 1 wherein dicyclopentadiene is added to (A).

4. The polymerizable thermosetting polyester composition according to Claim 1 wherein (D) is at least one member selected from the group consisting of acrylic acid, methacrylic acid, and fumaric acid.

5. The polymerizable thermosetting polyester composition according to Claim 1 wherein (D) is acrylic acid.

6. The polymerizable thermosetting polyester composition according to Claim 1 wherein (D) is methacrylic acid.

7. The polymerizable thermosetting polyester composition according to Claim 1 wherein (II) is prepared in the presence of a solvent.

8. The polymerizable thermosetting polyester composition according to Claim 1 wherein (III) is at least one member selected from the group consisting of dicumyl peroxide, 2,5-dimethyl-2,5-bis(butyl peroxy)-hexane, di-tertbutyl peroxide, 2,5-dimethyl-2,5-bis(butyl peroxy)hexyne-3.

9. The polymerizable thermosetting polyester composition according to Claim 1 wherein (III) is dicumyl peroxide.

10. The polymerizable thermosetting polyester composition according to Claim 1 wherein the amount of (I) used is about 60% by weight and the amount of (II) used is about 40% by weight based upon the total weight of (I) and (II) used.

11. The polymerizable thermosetting polyester composition according to Claim 1 wherein the amount of (III) used ranges from about 1% to about 5% by weight based upon the total weight of (I) and (II) used.

12. The polymerizable thermosetting polyester composition according to Claim 1 wherein filler and pigment are added.

13. The polymerizable thermosetting polyester composition according to Claim 1 wherein the amount of filler and pigment added ranges from about 1% to about 600% by weight based upon the total weight of (I) and (II) used.

14. A method for producing a fragmentized polymerizable thermosetting polyester molding composition comprising from about 1% to about 90% by weight, based upon the total weight of (I) and (II) used of, (I) at least one unsaturated polyester resin prepared by reacting (A) at least one member selected from the group consisting of unsaturated dicarboxylic acids and their acid anhydrides with (B) a polyhydric alcohol and (II) as the sole crosslinking agent for the unsaturated polyester resin from about 10% to about 99% by weight, based upon the total weight of (I) and (II) used of (II) a vinyl ester prepared by reacting one mole of (C) an epoxy resin selected from a group consisting of 4,4'-isopropylidene diphenol-epichloro hydrin epoxy resins, brominated 4,4'-isopropylidene diphenol-epichlorohydrin epoxy resins and phenol-epichlorohydrin epoxy resins having a melt point ranging up to about 100° C. with at least 2 moles of (D) a vinyl acid and from about 1% to about 10% by weight, based upon the total weight of (I) and (II) used of (III) a polymerization initiator.

15. The method for producing a polymerizable thermosetting polyester composition according to Claim 14 wherein (A) is at least one member selected from a group consisting of isophthalic acid, tetrabromophthalic anhydride, tetrachlorophthalic anhydride, phthalic acid, phthalic anhydride, maleic acid, maleic anhydride and fumaric acid and (B) is at least one member selected from a group consisting of ethylene glycol, propylene glycol, diethylene glycol and neopental glycol.

16. The method for producing a polymerizable thermosetting polyester composition according to Claim 18 wherein dicyclopentadiene is added to (A).

17. The method for producing a polymerizable thermosetting polyester composition according to Claim 14 wherein (D) is at least one member selected from the group consisting of acrylic acid and methacrylic acid.

18. The method for producing a polymerizable thermosetting polyester composition according to Claim 14 wherein (III) is at least one member selected from the group consisting of dicumyl peroxide, tert-butyl peroxybenzoate, 2,5-dimethyl -2,5-di-tert-butylperoxy hexane, di-tert-butyl peroxide, di-tert-butyl perphthalate.

19. The method for producing a polymerizable thermosetting polyester composition according to Claim 14 wherein (III) is dicumyl peroxide.

20. The method for producing a polymerizable thermosetting polyester composition according to Claim 14 wherein the amount of (I) used is about 60% by weight and the amount of (II) used is about 40% by weight based upon the weight of (I) and (II) used.

21. The method for producing a polymerizable thermosetting polyester composition according to Claim 14 wherein the amount of (III) used ranges from about 1% to about 5% by weight based upon the total weight of (I) and (II) used.

22. The method for producing a polymerizable thermosetting polyester composition according to Claim 14 wherein filler and pigment are added.

23. The method for producing a polymerizable thermosetting polyester composition according to Claim 22 wherein the amount of filler and pigment added ranges from about 1% to about 600% by weight based upon the total weight of (I) and (II) used.

References Cited
UNITED STATES PATENTS 3,462,514  8/1969  Kurkowski et al. _ 260—40 R X
3,301,743  8/1967  Fekete et al. _____ 260—836 X

OTHER REFERENCES

J. Bjorksten, *Polyesters and their Applications* (1956), page 40.

ALLAN LIEBERMAN, Primary Examiner

S. M. PERSON, Assistant Examiner

U.S. Cl. X.R.

260—37 EP, 835, 836, 873